Sept. 6, 1966                    H. R. WEED                    3,271,648
            UNIVERSAL-MOTOR COUNTER E.M.F. SPEED CONTROL CIRCUIT
                           Filed Dec. 26, 1963

INVENTOR.
HERMAN R. WEED,
BY
Yungblut, Melville, Strasser & Foster
ATTORNEYS.

United States Patent Office 3,271,648
Patented Sept. 6, 1966

3,271,648
UNIVERSAL-MOTOR COUNTER E.M.F.
SPEED CONTROL CIRCUIT
Herman R. Weed, Columbus, Ohio, assignor to Robbins & Myers, Inc., Springfield, Ohio, a corporation of Ohio
Filed Dec. 26, 1963, Ser. No. 333,451
14 Claims. (Cl. 318—331)

This invention relates generally to motor control circuits, and specifically to a circuit for regulating the speed of a universal or series A.-C. motor.

It is known that the no-load speed of a series A.-C. motor can be controlled within certain ranges by regulating the input voltage. This may be accomplished in practice by operating the motor through a variable voltage supply. Each operating voltage will have its own performance characteristics, but in general, it has been found that the speed-torque curve has a large negative slope. This means that as the shaft load on the motor is increased, motor speed will decrease rapidly. Furthermore, at low no-load speeds, only a low value of maximum torque can be obtained.

It is also known that a controlled rectifying device, such as a silicon controlled rectifier or a thyratron connected in series with a series A.-C. motor, can be used to control the motor speed by regulating the point in the supply cycle at which the rectifying device conducts or "fires." That is, the rectifying device acts as a switch, and until it fires, no power is available to the motor; once the rectifying device fires, the circuit is closed and power is delivered to the motor for the remainder of the half cycle. If the firing angle of the rectifying device is small, early in the cycle, a large portion of the supply voltage is available to the motor and it will tend to operate at a high speed. Conversely, as the firing angle approaches 180°, only a very small portion of the line voltage can be delivered to the motor, and hence the no-load speed will be greatly reduced.

It should be understood, of course, that the foregoing discussion has been in terms of a half-wave circuit. During the negative half-cycle, the rectifying device blocks the flow of negative current to the motor.

As a matter of technical accuracy, current in the supply line is not zero when the voltage goes through zero at the end of the half-cycle and conduction continues into the negative half-cycle for a short time determined by the circuit parameters. During this period, energy is returned to the supply line from the motor due to the positive current and negative supply voltage. Thus, the rectifying device blocks current flow in the negative half-cycle only after current has become zero at some point past 180°.

Accordingly, it is the general object of this invention to advantageously regulate the speed-torque performance of a universal or series A.-C. motor.

More specifically, it is an object of this invention to provide a circuit which will maintain a more nearly constant motor speed over a wide range of work loads than that obtained from a fixed A.-C. line voltage.

Still another object of this invention is to provide a circuit which gives adequate control over the no-load speed of a series A.-C. motor.

It has heretofore been proposed to regulate the firing point of a controlled rectifying device by using a gate or control circuit which is responsive in some manner to the generated voltage of the motor (which is proportional to the product of motor speed and field current), to attain a constant motor speed. Such systems have not been entirely satisfactory, because the generated voltage of the motor is proportional to field strength and hence approximately to field current, and when the current is zero, the residual voltage is often too small to be a usable signal.

It is, therefore, a further object of the invention to provide a discharge circuit for one of the series connected field windings of the motor, such that a usable field current will be flowing during the entire cycle due to the field time constant and stored energy, even though the armature current is zero part of the time.

Numerous other objects and advantages of this invention will become apparent to the skilled worker in the art as this specification proceeds. Keeping the above objects in mind, the invention will now be described in detail, reference being made to the accompanying drawings forming a part of this application. In the drawings.

Briefly, this invention contemplates the use of a controlled rectifying device connected in series in one of the power leads to a series A.-C. motor for controlling the flow of current to the motor in the manner described above. Certain circuits, described in more detail hereinafter, are connected to vary the firing point of a controlled rectifying device in response to the difference between (1) a manually adjustable reference voltage, and (2) an output voltage which is proportional to speed. In other words, under no-load conditions, the reference voltage minus the output voltage will adjust the firing angle to produce the desired motor speed. As motor speed drops under an applied load, the output voltage also drops, so that the net difference in voltage (reference voltage minus output voltage) is increased. This operates to advance (decrease) the firing angle of the controlled rectifying device, and speed-up the motor, thereby resulting in a more nearly constant motor speed.

Figure 1:
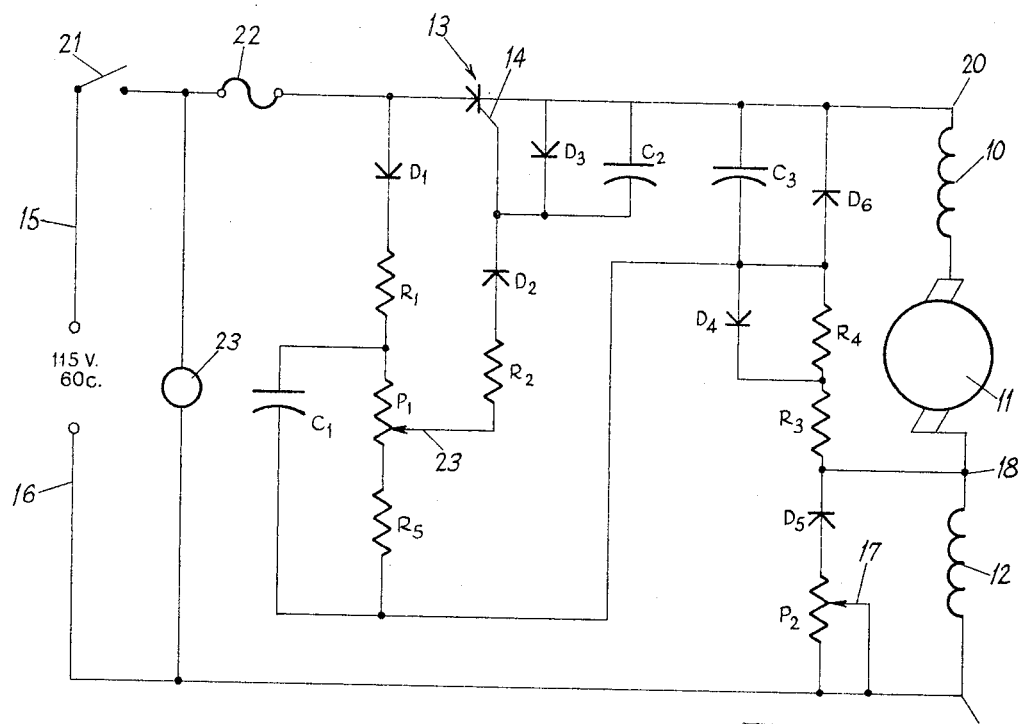
FIGURE 1 is a schematic diagram of the circuit of this invention.

Referring now to the schematic drawing of FIGURE 1, a series A.-C. motor is shown having a series connected field 10, armature 11, and field 12. Connected in series with the motor is a silicon controlled rectifier 13 (SCR13) having a gate 14. As is well known in the art, the SCR13 acts as a switch in the alternating surrent lines 15 and 16 which is fired or turned on when the current supplied from the gate 14 to the cathode reaches a certain level. It is turned off when the direction of the current flow from anode to cathode is reversed.

Inasmuch as the SCR13 is a rectifier, it can only conduct current in one direction from an alternating current supply. At the beginning of, for example, a positive half-cycle of the supply, the circuit containing the SCR13 is open, and no current is delivered to the motor. However, when the current delivered to the gate 14 reaches a certain level, the SCR13 fires, thereby closing the circuit, and delivering power to the motor for the remainder of that half-cycle. The change in direction of current flow after the beginning of the next half cycle turns the SCR13 off, and no power is delivered to the motor until the SCR13 is fired again during the next positive half cycle.

As noted above, the SCR13 is fired in response to the reference voltage tends to fire the SCR and the output put voltage which is proportional to motor speed. This is accomplished by (1) a circuit designed to produce an adjustable reference voltage tending to fire the SCR at such a time as to give a desired speed, and (2) another circuit for deriving an output voltage equal to the generated voltage of the motor. These circuits are interconnected so that the net voltage resulting therefrom is applied from cathode to gate in such a manner that the reference voltage tends to fire the SCR and the output voltage tends to oppose firing current in the gate.

The reference voltage mentioned above analytically includes two components: a D.-C. voltage and a superimposed A.-C. ripple with a positive slope during most of the conduction period of diode $D_1$. This reference voltage is produced across the potentiometer $P_1$ and resistor $R_5$ as a result of the half wave rectifier circuit including diode $D_1$, resistor $R_1$, potentiometer $P_1$, resistor $R_5$, capacitor $C_1$, Diode $D_4$, and resistor $R_3$, connected essentially across the A.-C. power lines during the conduction of $D_1$. This point will be explained later. Proper choice of the relative magnitudes of $R_1$, $P_1$ and $C_1$ will as noted above, produce both a D.-C. voltage on $C_1$, and a pronounced A.-C. ripple which has a positive slope during most of the conduction period of $D_1$.

To control the firing point of the SCR13 in the manner briefly outlined above, it is necessary to produce a voltage across the output terminals of a biasing or sensing circuit which is approximately proportional to motor speed, and which is of such polarity as to bias off or oppose gate current in the SCR13. In other words, the output or biasing voltage tends to delay the firing point of the SCR13 as determined by the reference voltage applied to the gate 14 by the reference circuit described above.

As noted at the outset of this specification, the generated voltage of a motor is proportional to motor speed; it is also proportional to field strength, which is in turn approximately proportional to field current. During the period when control of the SCR13 is possible, no current will be flowing in the motor armature, so that it has heretofore often been impossible to effectively utilize generated voltage as a control signal.

The circuit of this invention includes a field discharge circuit connected across one of the field windings of the motor such that a usable field current will be flowing during the entire cycle due to the field time constant and stored energy.

The field discharge circuit includes the diode $D_5$ and the potentiometer $P_2$, and will, due to the time constant, still have a current flowing in it at the point of the next cycle when the SCR13 is to be fired. This discharge current will be decaying exponentially, so that adjustment of the tap 17 of the potentiometer $P_2$ will change the time constant, and hence, the value of the field current near the firing angle of the SCR13. The generated voltage of the motor, after the armature current has reached zero (which is the period during which control of the SCR13 is possible), will be approximately proportional to the motor speed and to the above field current.

The biasing or sensing circuit includes the capacitor $C_3$ and resistor $R_3$, and it will now be clear that it is necessary to produce a voltage across capacitor $C_3$ that is approximately proportional to speed. When the SCR13 fires, the capacitor $C_3$ charges through the diode $D_4$ and resistor $R_3$ to near the voltage across the points 18–20 which is the voltage across the field 10 and armature 11. The time constant of the circuit $R_3C_3$ is relatively short, so that the voltage on capacitor $C_3$ essentially follows the voltage 18–20, the high frequency ripple due to brush arcing being filtered out across resistor $R_3$. The peak of this voltage is greater than the generated speed voltage that will follow, so provision must be made for the voltage on capacitor $C_3$ to decrease in order to follow the generated signal. This is accomplished through resistor $R_4$, and resistor $R_3$, which together, provide for reducing the voltage on $C_3$ to the generated speed voltage, the diode $D_6$ preventing capacitor $C_3$ from charging negatively.

An examination of the diagram of FIG. 1 will show that the circuit producing the positive reference voltage described above, is returned to the point 18 rather than directly to the A.-C. line. This means that the positive voltage rise from the point 18 to the point 19 due to the current of the field 12 discharging serves to add to the A.-C. line voltage during the positive half cycle, and increases slightly the reference voltage on the capacitor $C_1$. This acts as a degree of positive current feedback tending to increase the reference voltage and fire the SCR 13 earlier as the load current increases. The extent of this effect depends upon the setting of the tap 17 of the potentiometer $P_2$, since the diode $D_5$ tends to have a constant forward drop for a large range of currents. With tap 17 set to short out $P_2$ and neglecting the drop on $D_5$, points 18 and 19 are at the same potential.

It is also true that the setting of the potentiometer $P_2$ has a second very important effect. By increasing the setting and thus decreasing the field discharge time constant, the decaying current of the field 12 discharges to a small portion of its original value in the period before the SCR13 is fired. This tends to overcome any tendency of the circuit to be unstable at high load currents. That is, at low speeds and high load current, the generated speed voltage is relatively large with respect to the reference setting voltage and may produce a signal on capacitor $C_3$ sufficiently large to keep the SCR13 from firing for several cycles. Then, when the SCR13 does fire, the voltage of the sensing circuit again biases the SCR13 off and a type of "on-off" oscillation, often called "motor-boating" occurs. In the circuit of this invention, potentiometer $P_2$ acts both to decrease the field current during the control period of the SCR13, thus reducing the speed signal voltage and to increase the reference voltage on capacitor $C_1$, giving a positive feedback proportional to the current. This adjustment is referred to as the stability adjustment.

The A.-C. ripple superimposed on the D.-C. reference of capacitor $C_1$ determines the amount of change in the D.-C. difference between the reference voltage and the generated speed voltage of the motor that is needed to change the firing angle of the SCR13 by any fixed amount. Thus, the ripple amplitude is inversely proportional to the loop gain. As the setting of potentiometer $P_1$ is reduced to lower the no-lead speed, the ripple also decreases, thereby raising the gain. The result is demonstrated by the more nearly flat speed curves for the lower values shown in FIG. 2.

In addition to the elements just described, the circuit shown in FIG. 1 also includes the diode $D_3$ and the capacitor $C_2$, the former being simply a protective device to prevent the SCR13 from receiving any appreciable negative gate voltage and the latter acting as a filter.

Furthermore, it may be desirable in the commercial practice of the invention to include a switch 21 and a fuse 22 in the A.-C. line, and to include a small lamp 23 which will indicate when the device is turned on.

Figure 2:
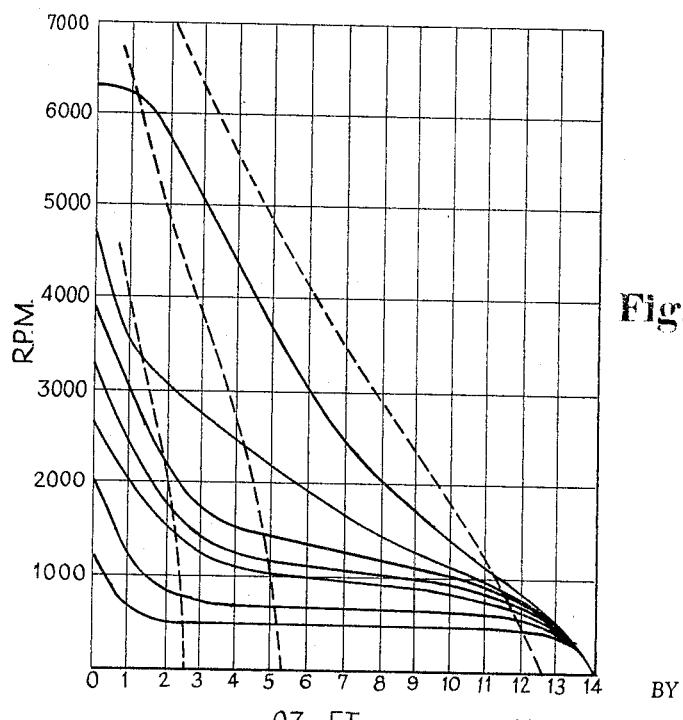
FIGURE 2 is a graph illustrating the performance of a series A.-C. motor connected to the circuit of this invention, and compared with the performance of the same motor when supplied by a conventional A.-C. source.

The circuit of this invention has been tested on an experimental basis, and it has been found that the speed-torque curves shown in FIG. 2 are achieved. (The performance of the same motor when supplied by a conventional A.-C. source is shown in dotted lines.) The skilled worker in the art will immediately recognize the advantages of such performance curves. In the prototype referred to above, the following components were used:

(a) Field discharge circuit:
  $P_2$, 10 ohm _____ 25 watt.
  $D_5$, Sarkes-Tarzian _____ 40JC3N.
(b) Biasing or sending circuit:
  $C_3$, 0.2 mfd. _____ 200 volt.
  $R_4$, 5000 ohm _____ ½ watt.
  $R_3$, 25 ohm _____ 2 watt.
  $D_4$, $D_6$, Sylvania _____ IN2070.
(c) Reference circuit:
  $C_1$, 20 mfd. _____ 150 watt.
  $P_1$, 3000 ohm _____ 2 watt.
  $R_1$, 3000 ohm _____ 2 watt.
  $R_2$, 200 ohm _____ 1 watt.

| | |
|---|---|
| $R_5$, 500 ohm | ½ watt. |
| $D_1$, $D_2$, Sylvania | IN2070. |

(d) Other:

| | |
|---|---|
| SCR13, General Electric | C36H. |
| $D_3$, Sylvania | IN2070. |
| $C_2$, 4 mfd. | 50 volt. |

Numerous modifications in this invention will, of course, occur to the skilled worker in the art. For example, the circuit may be operated without the diode $D_6$ and the resistor $R_4$, which as noted above, serve to decrease and limit the voltage on capacitor $C_3$. Without these elements, the voltage on capacitor $C_3$ can only drop to the D.-C. voltage on capacitor $C_1$, until the point in the positive half cycle when diode $D_4$ is turned on to recharge the reference circuit. The voltage on capacitor $C_3$ will then drop to the generated signal value ready to control the SCR13. Since it has been held positive, its effect has been to hold off any possible gate current until this time.

In another modification, if the filtering of potentiometer $P_1$ and capacitor $C_1$ is increased to the point that the ripple is negligible and a fixed amplitude ripple is introduced by the addition of another parallel capacitor and potentiometer, the gain of the system could be fixed by the second parallel potentiometer, and would not change over the speed setting range due to ripple variation.

In addition, this circuit may be used for a full wave rectified supply rather than half wave. However, the single SCR will lose control as soon as armature conduction becomes continuous. That is, when the point at which the current of a particular half-cycle goes to zero equals the firing point of the next, the SCR sees continuous conduction.

Similarly, operation is possible without the diodes $D_4$ and $D_6$, and the resistor $R_4$. Such operation will of course, have some effect on the reference voltage across $C_1$ due to the negative swing of the voltage on capacitor $C_3$.

The circuit of this invention may be utilized with the resistor $R_3$ connected to the point 19 rather than the point 18 ($D_5$ still connected to 18). The positive current feedback can be increased since the voltage across potentiometer $P_2$ will subtract directly from the generated voltage during the control period. This results in flatter curves, but unless adjusted over the speed range, may result in speed-torque curves with positive slopes at low speed, high load current operation. The field discharge path $D_5 P_2$ may be placed on field 10 in this case with no difference in performance.

It is believed that the foregoing constitutes a full and complete disclosure of this invention. While it has been described in terms of a specific exemplary embodiment, no limitations are intended except insofar as set forth in the following claims.

What is claimed as new, and what it is desired to secure by Letters Patent is:

1. A circuit for regulating the speed of an electric motor having series connected armature and at least one field winding, comprising:
   (a) power leads connected across said motor,
   (b) one of said power leads containing in series a controlled rectifying device having a gate terminal, for controlling the flow of current to said motor,
   (c) reference circuit means connected effectively across said power leads and to said gate terminal for deriving a reference voltage characterized by a D.-C. component and an A.-C. ripple,
   (d) field discharge circuit means connected across said field winding of said motor for producing a unidirectional field current and resultant magnetic field at all times, and
   (e)سensing circuit means for deriving an output voltage proportional to the generated voltage of said motor, said last named circuit means being connected between the cathode of said controlled rectifying device and said reference circuit means, and of a polarity tending to oppose the portion of said reference voltage applied to the gate of said controlled rectifying device,
   whereby the difference in voltage between said reference voltage and said output voltage determines the firing point of said controlled rectifying device.

2. The circuit claimed in claim 1 wherein said sensing circuit means includes a capacitor, a diode, and a resistor connected in series between a common lead from said armature and field windings and the cathode of said controlled rectifying device so as to include the armature but to exclude the field connected with said field discharge circuit means.

3. The circuit claimed in claim 1 wherein said sensing circuit means includes a parallel capacitor and diode, connected in series with a parallel diode and resistor, in series with a second resistor, said sensing circuit being connected between a common lead from said armature and field winding and the cathode of said controlled rectifying device so as to include the armature but to exclude the field connected with said field discharge circuit means.

4. The circuit claimed in claim 1 wherein said sensing circuit includes a capacitor, a diode, and a resistor connected in series across both the armature and the field that is discharging through said field discharge circuit means.

5. The circuit claimed in claim 1 wherein said reference circuit means includes a series connected diode, resistor, potentiometer having a variable tap, and second resistor, said potentiometer and second resistor being connected in parallel with a capacitor, said diode, resistor, potentiometer, second resistor, and capacitor being connected effectively across said power leads, and a series connected resistor and diode connected between said tap of said potentiometer and the gate terminal of said controlled rectifying device.

6. The circuit claimed in claim 5 including a second potentiometer and a second capacitor connected in parallel, said parallel second potentiometer and second capacitor being connected in series with said parallel capacitor and potentiometer resistor.

7. The circuit claimed in claim 1 wherein said controlled rectifying device is a silicon controlled rectifier, and including means for limiting the reverse gate voltage, said means comprising a capacitor and a diode connected between the gate terminal and cathode of said rectifier.

8. The circuit claimed in claim 1 wherein said field discharge circuit means includes a series connected diode and potentiometer, said diode and potentiometer being connected across said field winding.

9. The circuit claimed in claim 8 wherein said sensing circuit means includes a capacitor, a diode, and a resistor connected in series between a common lead from said armature and field windings and the cathode of said controlled rectifying device so as to include the armature but to exclude the field connected with said field discharge circuit means.

10. The circuit claimed in claim 8 wherein said sending circuit means includes a parallel capacitor and diode, connected in series with a parallel diode and resistor, in series with a second resistor, said sensing circuit being connected between a common lead from said armature and field winding and the cathode of said controlled rectifying device so as to include the armature but to exclude the field connected with said field discharge circuit means.

11. The circuit claimed in claim 8 wherein said sensing circuit includes a capacitor, a diode, and a resistor connected in series across both the armature and the field that is discharging through said field discharge circuit means.

12. The circuit claimed in claim 8 wherein said controlled rectifying device is a silicon controlled rectifier, and including means for limiting the reverse gate voltage, said means comprising a capacitor and a diode connected between the gate terminal and cathode of said rectifier.

13. The circuit claimed in claim 8 wherein said reference circuit means includes a series connected diode, resistor potentiometer having a variable tap, and second resistor, said potentiometer and second resistor being connected in parallel with a capacitor, said diode, resistor, potentiometer, second resistor, and capacitor being connected effectively across said power leads, and a series connected resistor and diode connected between said tap of said potentiometer and the gate terminal of said controlled rectifying device.

14. The circuit claimed in claim 13 including a second potentiometer and a second capacitor connected in parallel, said parallel second potentiometer and second capacitor being connected in series with said parallel capacitor and potentiometer resistor.

References Cited by the Examiner
UNITED STATES PATENTS

| | | | |
|---|---|---|---|
| 3,095,534 | 6/1963 | Cockrell | 318—331 X |
| 3,165,688 | 1/1965 | Gutzwiller | 318—331 X |
| 3,176,209 | 3/1965 | Cappello | 318—331 X |
| 3,177,417 | 4/1965 | Wright | 318—331 |

ORIS L. RADER, *Primary Examiner.*

S. GORDON, J. C. BERENZWEIG, *Examiners.*